United States Patent [19]
Rowland

[11] Patent Number: 5,444,857
[45] Date of Patent: Aug. 22, 1995

[54] METHOD AND APPARATUS FOR CYCLE TRACKING VARIABLE DELAY LINES

[75] Inventor: Stephen T. Rowland, Folsom, Calif.

[73] Assignee: Intel Corporation, Santa Clara, Calif.

[21] Appl. No.: 60,804

[22] Filed: May 12, 1993

[51] Int. Cl.$^6$ ............................................. G06F 13/38
[52] U.S. Cl. ................................................ 395/309
[58] Field of Search .................. 395/325, 275, 550

[56] References Cited

U.S. PATENT DOCUMENTS

| | | | |
|---|---|---|---|
| 3,908,084 | 9/1975 | Wiley | 178/69.5 R |
| 4,459,656 | 7/1984 | Wilder, Jr. . | |
| 4,701,841 | 10/1987 | Goodrich et al. | 395/325 |
| 4,750,113 | 6/1988 | Buggert | 395/275 |
| 4,787,064 | 11/1988 | Wagner | 340/825.89 |
| 5,097,437 | 3/1992 | Larson | 395/775 |
| 5,165,037 | 11/1992 | Culley | 395/800 |
| 5,191,581 | 3/1993 | Woodbury et al. | 395/275 |
| 5,191,653 | 3/1993 | Banks et al. | 395/275 |
| 5,191,657 | 3/1993 | Ludwig | 395/325 |
| 5,201,036 | 4/1993 | Yoshimatsu | 395/325 |
| 5,218,686 | 6/1993 | Thayer | 395/425 |
| 5,237,676 | 8/1993 | Arimilli et al. | 395/550 |
| 5,261,057 | 11/1993 | Coyle et al. | 395/275 |
| 5,276,684 | 1/1994 | Pearson | 370/94.1 |
| 5,276,858 | 1/1994 | Oak et al. | 395/550 |
| 5,301,279 | 4/1994 | Riley | 395/275 |
| 5,305,452 | 4/1994 | Khan et al. | 395/550 |

Primary Examiner—Jack B. Harvey
Assistant Examiner—Paul R. Myers
Attorney, Agent, or Firm—Blakely, Sokoloff, Taylor & Zafman

[57] ABSTRACT

Peripheral components are interfaced to a computer system through cycle tracking variable delay lines. The computer system includes a system I/O containing, in part, a bus cycle tracking apparatus. The bus cycle tracking apparatus includes cycle tracking logic, a plurality of delay lines, leading and trailing multiplexors (MUXs) and a state MUX. The bus cycle tracking apparatus controls the asynchronous delay of an output reference signal. A plurality of leading and trailing timing reference signals are provided as inputs to the plurality of delay lines. The leading and trailing timing references are delayed by the delay lines a time specified in accordance with an AC timing specification. The bus cycle is tracked such that during a leading/idle state, the leading timing reference is selected as the output reference, and during a trailing state, the trailing reference is selected. The independent control of the output reference signal allows all bus cycle events to be controlled precisely and independently.

19 Claims, 8 Drawing Sheets

METHOD AND APPARATUS FOR CYCLE TRACKING VARIABLE DELAY LINES

BACKGROUND OF THE INVENTION

1. Field of the Invention

The present invention relates to the field of interfacing peripheral devices to a computer system, and more particularly, to methods and apparatus for bus cycle tracking variable delay lines.

2. Art Background

In order to integrate peripheral components, such as external memory cards, modems and the like, some computer systems comprise an open-ended architecture such that a number of peripheral components may be interfaced to the computer system. Computer systems comprise, address, data and control buses to provide a means for interfacing peripheral components with the computer system resources. In order to interface external peripheral components to a computer system, the computer buses comprise timing and voltage level specifications such that a designer need only comply with the bus specifications to interface the desired peripheral component with the computer system. However, once the bus specification is fixed, it cannot be changed without losing compatibility with existing peripheral components. It may be desirable to change the timing specifications, or AC specifications, because new technology provides faster components. Therefore, it is desirable to be able to change AC specifications for interfacing peripheral components while remaining compatible with existing peripheral components.

In general, the present invention provides a means for generating an output reference signal to interface peripheral components with a computer system. Specifically, the present invention provides methods and apparatus for tracking a bus cycle to delay the output reference signal in accordance with a timing specification. If the timing specification is changed, or if faster components are used to interface the computer system with existing peripheral components, then the output reference signal is delayed accordingly.

SUMMARY OF THE INVENTION

The present invention provides apparatus and methods for use in interfacing peripheral components to a computer system, and in particular, for providing cycle tracking variable delay lines to interface peripheral components to a computer bus. The computer system includes at least one central processing unit (CPU), and memory coupled to a system input/output (I/O) interface. The system I/O contains, in part, a bus cycle tracking apparatus and a bus controller. The bus cycle tracking apparatus comprises cycle tracking logic, a plurality of delay lines, leading and trailing multiplexors (MUXs) and a state MUX.

A plurality of leading and trailing timing reference signals, generated in accordance with bus timing cycles in the system I/O, are provided as inputs to the plurality of delay lines. For a specific bus application, the leading and trailing timing reference signals comprise address, control, and command signals input from the system I/O. The leading and trailing timing reference signals are propagated through the delay lines, and input to the leading and trailing MUXs, respectively. The system I/O generates mode signals to indicate an operating mode of the bus, and a command signal to indicate the initiation of a bus cycle.

The bus cycle tracking apparatus controls the asynchronous delay of a digital signal, such as an output reference signal, which is controlled by a variety of bus cycle events. The bus cycle events are designated by leading and trailing timing reference signals. The leading and trailing MUXs are controlled by the cycle tracking logic such that one leading timing reference signal and one trailing reference signal are selected for input to the state MUX. The output of the state MUX is an output reference signal used to interface peripheral components to the computer bus. The output reference signal can be used in a variety of applications in bus timing and control. The command signal specifies a beginning and an end of the bus cycle, and the mode signals specify to the cycle tracking logic any number of bus transaction modes for the cycle tracking module.

In operation, the beginning of the bus cycle is signified by the falling edge of the command signal. The leading timing references and trailing timing references are delayed by the delay lines a time specified in accordance with an AC timing specification. Initially, the cycle tracking logic is in a idle/leading state. Upon detecting the falling edge of the command signal, the cycle tracking logic generates a mode select for selection of timing reference signals corresponding to the mode signals. The cycle tracking logic sets a CMD status signal to select the leading timing reference as the output reference signal during the idle/leading state. After the beginning of the bus cycle, the cycle tracking logic transitions into a trailing state. The CMD status selects the trailing MUX output as the input to the state MUX which in turn provides the output reference signal. Upon termination of the CMD signal, the cycle tracking logic transitions into the leading/idle state and is ready for the next bus cycle.

BRIEF DESCRIPTION OF THE DRAWINGS

The objects features and advantages of the present invention will be apparent from the following detailed description of the preferred embodiment of the invention with references to the drawings in which.

DETAILED DESCRIPTION OF THE INVENTION

An apparatus and methods for cycle tracking variable delay lines are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
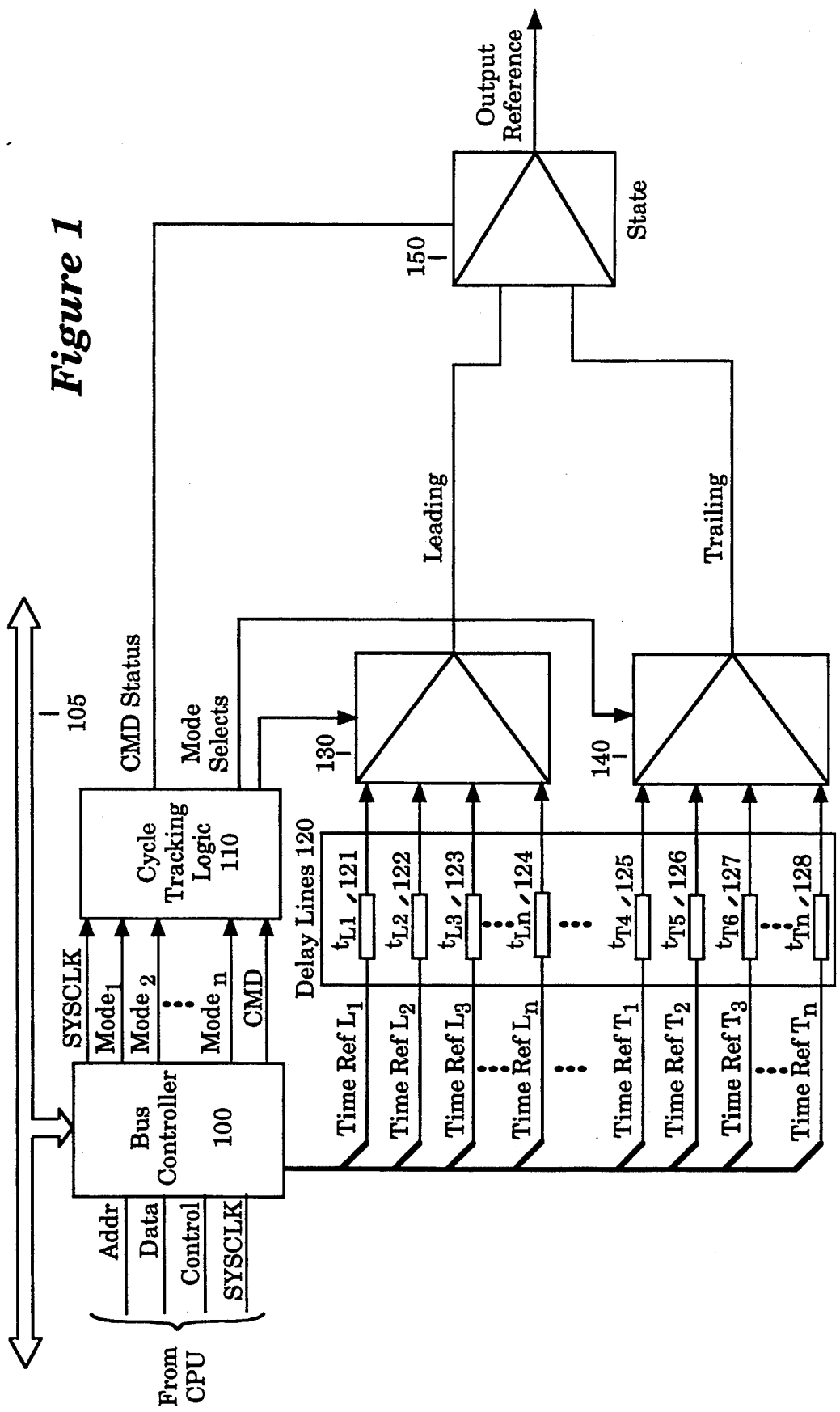
FIG. 1 illustrates a high level block diagram incorporating the teachings of the present invention.

Referring to FIG. 1, a high level block diagram incorporating the teachings of the present invention is illustrated. A bus controller 100 provides timing and arbitration control of a computer bus 105. The bus controller 100 and the computer bus 105 are intended to represent a broad category of internal computer communications devices, such as a computer address/data bus, which are well known in the art and which will not be described further. The bus controller 100 receives address, data, control and a bus clock (SYSCLK) as inputs, and in turn outputs a plurality of signals to control and drive the computer bus 105. In addition, the bus controller 100 provides signals for operation of cycle tracking logic 110. Specifically, the bus controller 100 provides the SYSCLK, a command signal, and a plurality of mode signals to cycle tracking logic 110. The cycle tracking logic 110 outputs a command status signal and mode select signals.

Also shown in FIG. 1 is a delay line module 120 comprising a plurality of digital delay lines. Timing reference signals are provided as inputs to delay line module 120. For purposes of explanation, the timing reference signals are designated as Time Ref L1 through Time Ref L3, and Time Ref T1 through Time Ref T3. For a specific bus application, the timing reference signals comprise address, control, and command signals input from the bus controller. The timing reference signals are propagated through the delay line module 120, and input to a leading multiplexor (MUX) 130 and a trailing MUX 140. The leading MUX 130 and trailing MUX 140 are controlled by cycle tracking logic 110 such that one timing reference signal L1 through L3 and one trailing reference signal T1 through T3 are selected for input to a state MUX 150. The output of state MUX 150 is an output reference signal used to interface an agent to the computer bus 105.

As will be apparent to one skilled in the art, the output reference signal can be used in a variety of applications in bus timing and control. For example, the output reference signal may comprise an enabling signal for controlling latches on computer bus 105, or the output reference signal may be used to control a transceiver used to couple two buses. An application and specific implementation for the output reference signal for a computer system is described more fully below.

The cycle tracking apparatus illustrated in FIG. 1 controls the asynchronous delay of a digital signal, such as the output reference signal, which is controlled by a variety of bus cycle events. The bus cycle events are designated by leading and trailing timing reference signals. The command signal (CMD) output from the bus controller 100 specifies a beginning and an end of the bus cycle. The mode signals, designated on FIG. 1 as $Mode_1$–$Mode_n$, specify to the cycle tracking logic 110 any number of bus transaction modes for the cycle tracking module. Each bus mode specifies a leading timing reference and a trailing timing reference. For the example illustrated in FIG. 1, $Mode_1$ specifies selection of leading timing reference L1 and trailing timing reference T1; $Mode_2$ specifies selection of leading timing reference L2 and trailing timing Ref T2; and $mode_n$ specifies selection of leading timing reference $L_n$ and trailing timing reference $T_n$. The leading timing references and trailing timing references are input to the delay lines 120. Specifically, the time $ref_{L1}$, time $ref_{L2}$, time $ref_{L3}$, and time $ref_{Ln}$ are input to $t_{L1}$ 121, $t_{L2}$ 122, $t_{L3}$ 123 and $t_{Ln}$ 124, and time $ref_{T1}$, time $ref_{T2}$, time $ref_{T3}$ and time $ref_{Tn}$ are input to $t_{T1}$ 125, $t_{T2}$ 126, $t_{T3}$ 127 and $t_{Tn}$ 128, respectively.

In operation, the beginning of the bus cycle is signified by the falling edge of the command signal. The leading timing references L1–L3 and trailing timing Refs T1–T3 are delayed a time specified in accordance with an AC timing specification. Initially, cycle tracking logic 110 is in a idle/leading state. Upon detecting the falling edge of the command signal, the cycle tracking logic 110 generates a mode select for selection of timing reference signals corresponding to the mode selected. For example, if the $mode_2$ signal is active, then leading timing reference L2 is selected as the output of leading MUX 130, and trailing timing reference T2 is selected as the output of trailing MUX 140. In addition to providing the mode select, the cycle tracking logic 110 sets a CMD status signal to select the leading timing reference as the output reference signal during the idle/leading state.

In a preferred embodiment of the present invention, one SYSCLK cycle after the beginning of the bus cycle, the cycle tracking logic 110 transitions into a trailing state. However, a transition from the idle/leading state to the trailing state may occur at any time prior to one SYSCLK cycle before the termination of the bus cycle. The CMD status selects the trailing MUX 140 output as the input to the state MUX 150. The output of the state MUX 150 is the output reference signal. In general, the cycle tracking module of the present invention provides a means for generating an output reference signal based on a first timing event and a second timing event. The independent control of the output reference signal allows all bus cycle events to be controlled precisely and independently.

Figure 2:
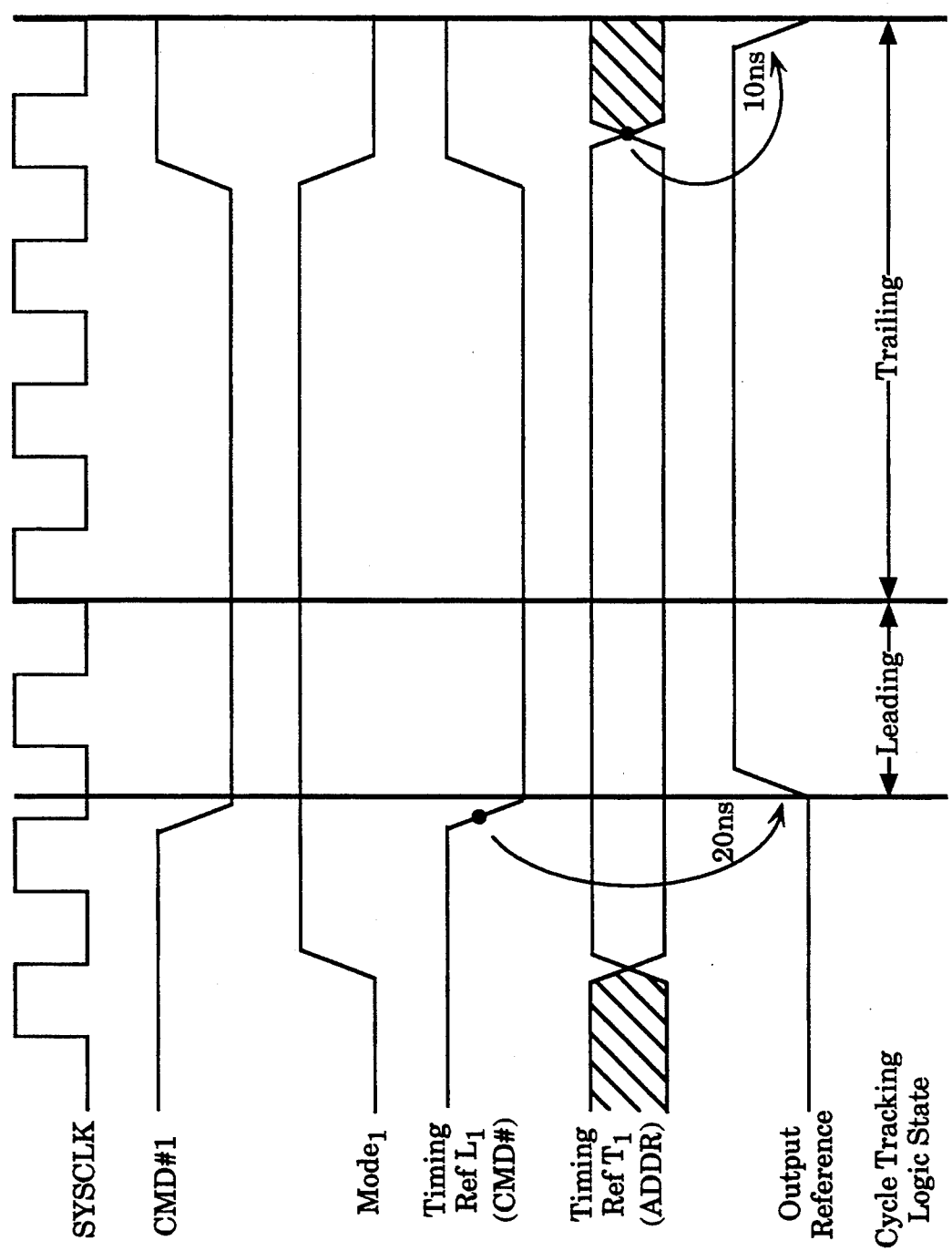
FIG. 2 illustrates a timing diagram incorporating the teachings of the present invention.

Referring to FIG. 2, a timing diagram illustrating the operation of the present invention is illustrated. The SYSCLK signal is shown as a digital clock signal. The SYSCLK signal is a general purpose system clock for providing timing for computer bus 105. As discussed above, the command signal input to cycle tracking logic 110 designates any number of valid commands specifying a bus operation on the computer bus 105. In FIG. 2, the command for a bus transaction is designated as CMD#1, and is activated on the falling edge of the CMD#1 signal. For purposes of explanation, a single bus mode is illustrated in FIG. 2. The bus mode is designated by a $Mode_1$ signal such that a high state of the $Mode_1$ signal indicates the bus is operating in $Mode_1$. Also shown in FIG. 2 are a leading timing reference L1 and a trailing timing reference T1. For the example illustrated in FIG. 2, a leading timing reference comprises the (CMD#1) signal, and a trailing timing reference comprises a bus address (ADDR). The output reference signal is specified as beginning twenty nanoseconds (nsecs), $t_{L1}$, after activation of CMD#1, and ending ten nsecs, $t_{T1}$, after the bus address (ADDR) is invalid.

Figure 3:
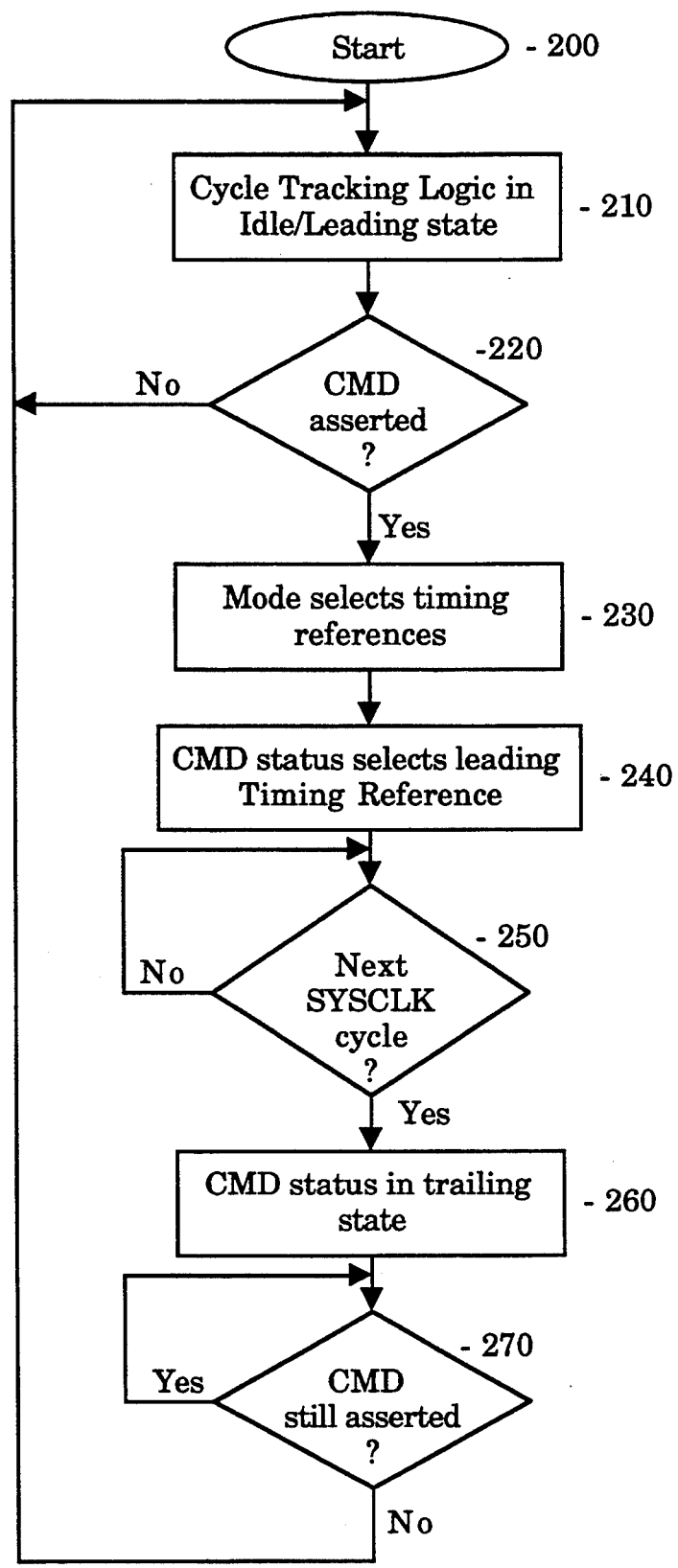
FIG. 3 illustrates a flow diagram for the cycle tracking logic of the present invention.

Referring to FIG. 3, a flow diagram illustrating the bus cycle tracking logic of the present invention is illustrated. In block 210, the cycle tracking logic resides in the idle/leading state. The combination of the idle/leading state into a single state simplifies the cycle tracking logic, although the cycle tracking logic may comprise an idle, leading and trailing states without deviating from the spirit and scope of the invention. The cycle tracking logic remains in the idle/leading state until a command is asserted as shown in block 220. Once a command is asserted, the cycle tracking logic 110 sets the mode select signals based on the active mode signal. For example, if mode 1 is selected, then the mode selects timing reference L1 and timing reference T1 at leading MUX 130 and trailing MUX 140 respectively. In 240, cycle tracking logic 110 sets the command status signal to select the leading timing reference such that the leading timing reference comprises the output reference. The cycle tracking logic 110 waits for the next SYSCLK cycle, and upon termination of the next SYSCLK cycle, the cycle tracking logic 110 sets the command status signal to select the trailing timing reference. In block 270, the cycle tracking logic then ascertains whether the command is still asserted. Upon termination of the bus cycle, cycle tracking logic 110 transitions from the trailing state to the idle/leading state. At this point, the cycle tracking logic 110 is in the idle/trailing state and is ready for the next bus cycle.

Switching from the leading state to the trailing state, one SYSCLK after the beginning of the bus cycle, provides glitch protection because both the leading and the trailing timing signals input to state MUX 150 are stable during the state transition. In order to implement the glitch protection of the present invention, two mode MUXs and one state MUX are utilized. The single state MUX directly drives the output reference signal. In this configuration, switching from the idle/leading state to the trailing state does not generate a glitch in the output reference signal.

Figure 4:
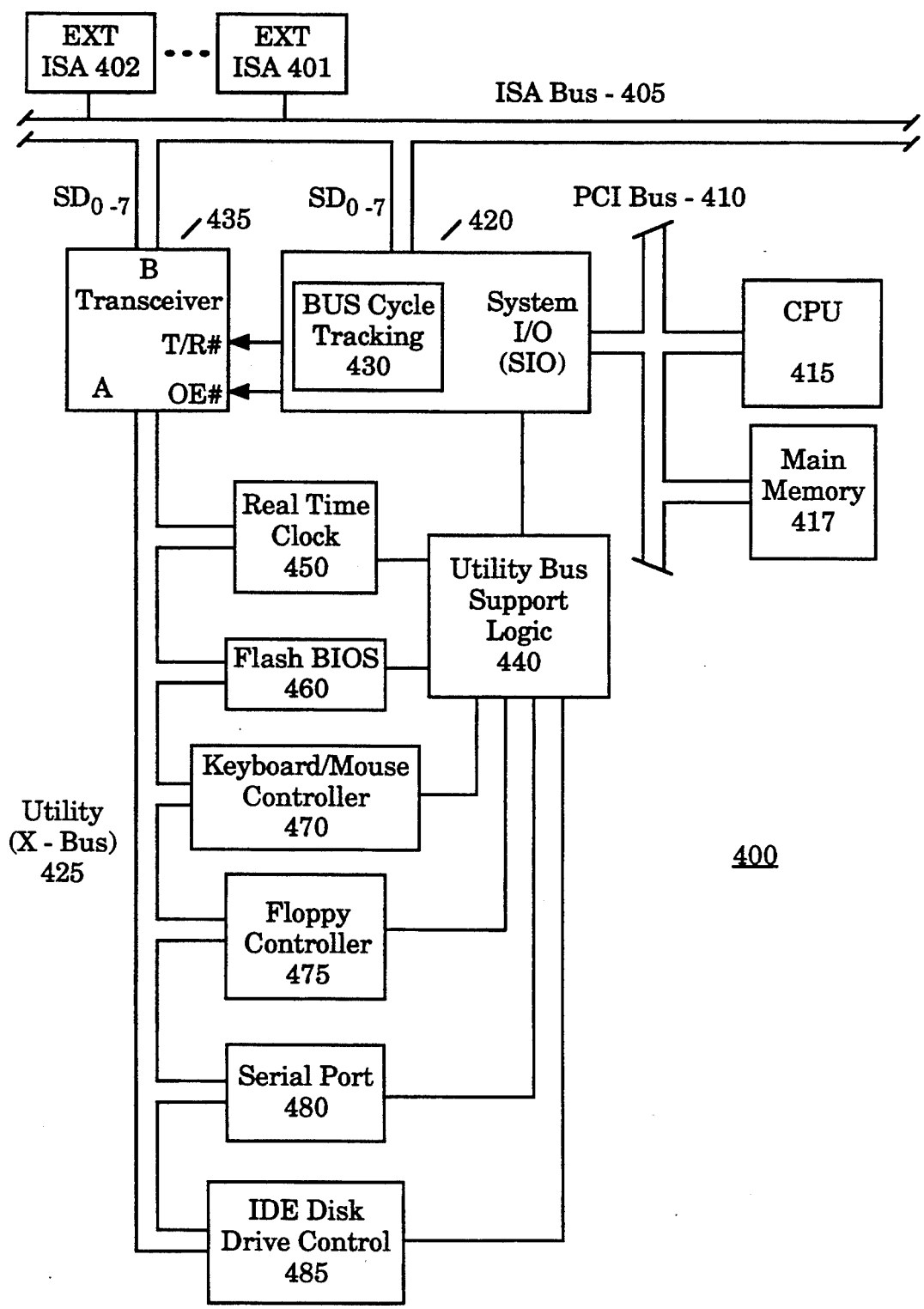
FIG. 4 illustrates a computer system incorporating the teachings of the present invention.

Referring to FIG. 4, a portion of a computer system incorporating the teachings of the present invention is illustrated. The computer system 400 comprises a central processing unit (CPU) 415 coupled to main memory 417 via a peripheral component interconnect (PCI) bus 410. In addition, a plurality of other components, such as a cache memory module, may be coupled to PCI bus 410. The computer system 400 also comprises a utility bus 425 and an ISA bus 405. The utility bus 425 is coupled to the PCI bus 410 through a system I/O 420. In a preferred embodiment, the system I/O 420 comprises a single integrated circuit, manufactured by Intel ™ Corporation, part number 82378IB. The system I/O 420 comprises, in part, a bus cycle tracking unit 430. For a complete description of system I/O 420, see System I/O SIO 82378IB, revision 1.0, Order Number: 290473-001, Intel ™ Corporation. The system I/O 420 is coupled to a transceiver 435. The transceiver 435 electrically couples the utility bus 425 to the ISA bus 405. The utility bus 425 comprises a plurality of computer system components, such as a real time clock 450, flash BIOS 460, keyboard/mouse controller 470, a floppy controller 475, a serial port 480, and an IDE disk drive control 485. The utility bus components are controlled via the system I/O 420 and utility bus support logic 440. For a complete description of utility bus support logic 440, see System I/O SIO 82378IB, revision 1.0, Order Number: 290473-001, Intel ™ Corporation.

The ISA bus 405 comprises a plurality of external I/O components for operation in conjunction with computer system 400. For purposes of explanation, two external cards 401 and 402 are illustrated in FIG. 4. The external ISA cards 401 and 402 may provide any number of functions for the computer system 400. In a preferred embodiment of the present invention, system I/O 420 incorporates a fully ISA bus compatible master and slave interface. The system I/O 420 directly drives six ISA slots without external data or address buffers. Therefore, the external data and address buffers usually required for the external ISA component cards are now integrated onto the system I/O 420 integrated circuit. Because the system I/O 420 integrated circuit is a high speed part, the AC timing specification for the ISA bus cycle is changed. To compensate for the bus timing changes, the bus cycle tracking 430 is integrated into the system I/O interface. In general, the bus cycle tracking 430 provides enable and control to interface PCI initiated, ISA master and direct memory access (DMA) transfers to the utility bus 425.

Figure 5A:
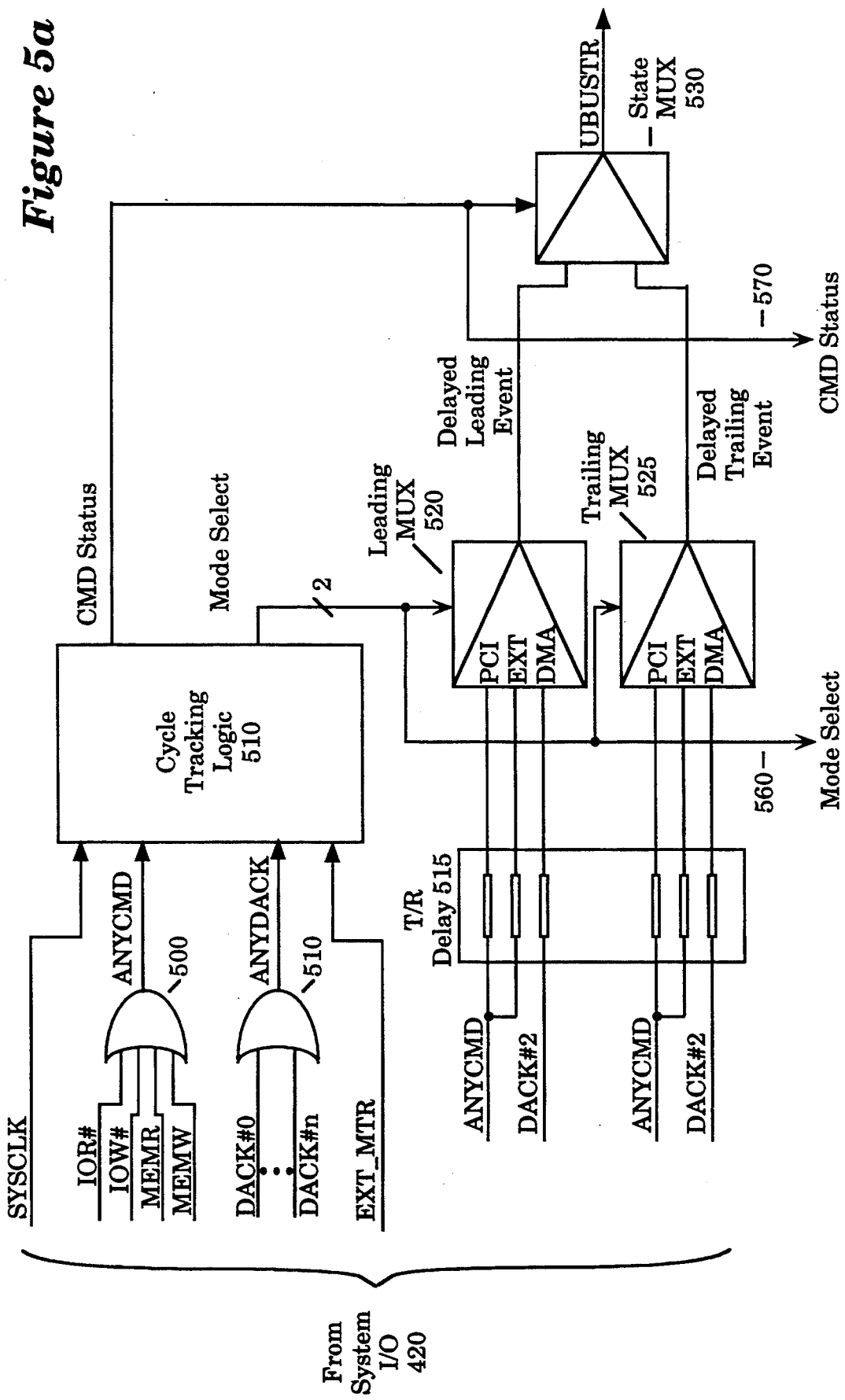
FIGS. 5a anal 5b illustrate a block diagram of bus cycle tracking incorporating the teachings of the present invention.
Figure 5B:
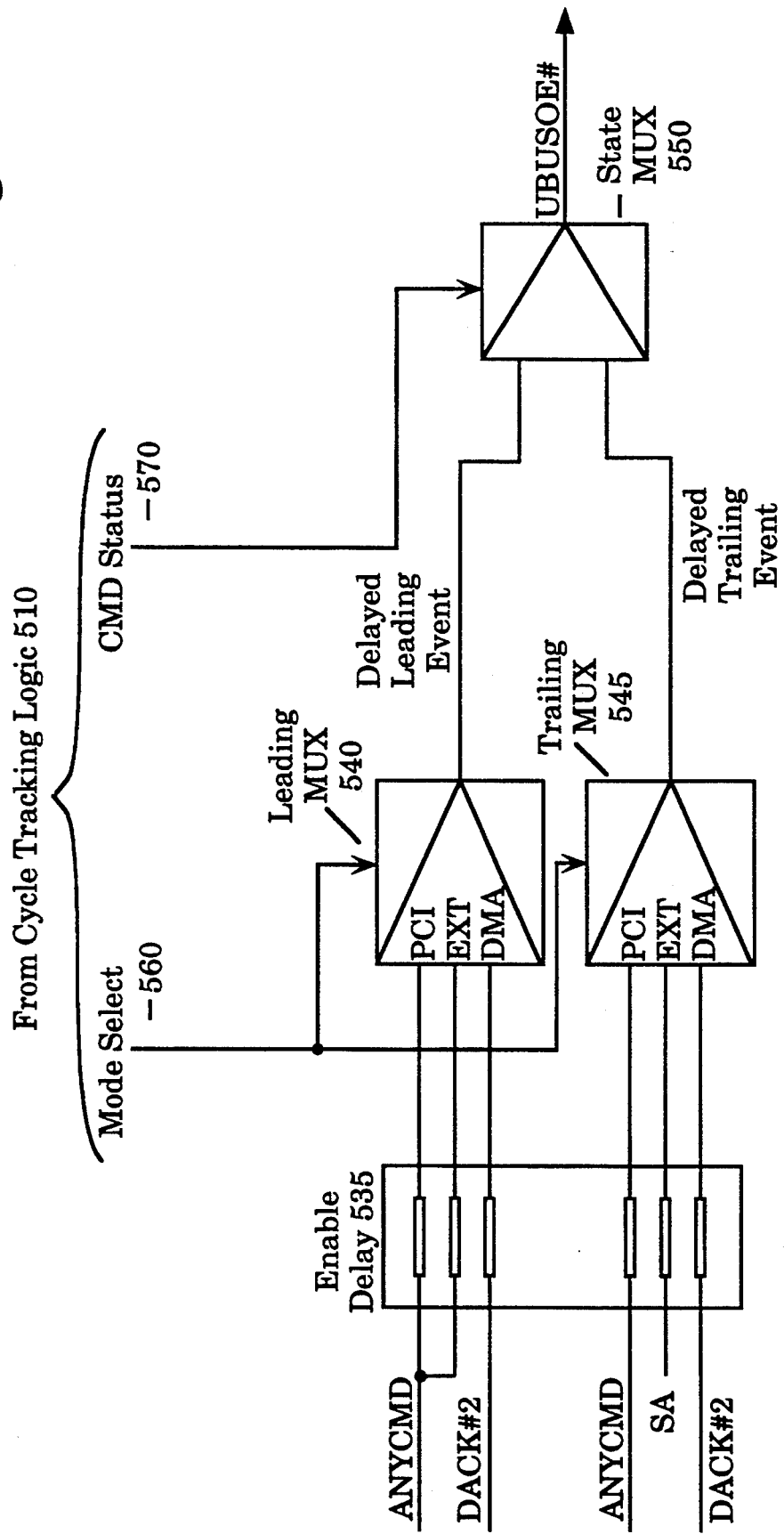

Referring to FIGS. 5a and 5b, a block diagram illustrating the bus cycle tracking 430 for a preferred embodiment of the present invention is illustrated. The bus cycle tracking 430 comprises cycle tracking logic 510 which is coupled to a plurality of signals generated by the system I/O 420. Specifically, the system I/O 420 generates bus commands IOR#, IOW#, MEMR# and MEMW#. The bus commands are input to OR gate 500, and an ANYCMD signal is output from OR gate 500 to indicate when any of the bus commands are active. The system I/O 420 also generates mode signals including a plurality of DACK# signals indicating a DMA transfer, and an EXT_MTR signal indicating an ISA master initiated bus cycle. The plurality of DACK# signals are provided as inputs to an OR gate 505 to generate an ANYDACK signal. In addition, system I/O 420 generates a SYSCLK for bus cycle clocking which is input to cycle tracking logic 510.

The bus cycle tracking 430 also comprises a transmit/receive (T/R) delay module 515 and an enable delay module 535. The T/R and enable delay modules 515 and 535 are intended to represent a broad category of digital delay lines such as a plurality of inverters coupled in a serial chain to generate the desired delay time. Digital delay lines such as T/R and delay modules 515 and 535 are well known in the art and will not be described further. From system I/O 420, a plurality of leading timing events and a plurality of trailing timing events are input to T/R delay module 515 and enable delay module 535. The delay times for the leading and trailing timing events are provided in accordance with an AC specification for the output reference generated. A specific description of the leading and trailing timing events for each bus mode is discussed more fully below.

For each bus cycle operation, the system I/O 420 generates a command signal IOR#, IOW#, MEMR# or MEMW#. The plurality of command signals are provided to OR gate 500, and the ANYCMD output of OR gate 500 indicates if one of the bus commands is active. The ANYCMD signal is input to cycle tracking logic 510. At this time, cycle tracking logic 510 resides in an idle/leading state. From an active ANYCMD signal, cycle tracking logic 510 generates mode select signals 560 from the input signals ANYDACK and EXT_MTR. Although there are three modes, only two mode signals are required to indicate all three bus modes. The mode select signals select an input leading timing event at leading MUXs 520 and 540, and a trailing timing event at trailing MUXs 525 and 545. The cycle tracking logic 510 generates a command status signal 570 which, during the leading state, selects the outputs of leading MUXs 520 and 540 for input to state MUXs 530 and 550, respectively.

The output of state MUX 530 is an output reference signal UBUSTR, and the output of state MUX 550 is an output reference signal UBUSOE#. Referring to FIG. 4, the UBUSTR output reference signal is coupled to a T/R# pin on transceiver 435, and the UBUSOE# output reference signal is coupled to an OE# pin on transceiver 435. Referring again to FIGS. 5a-b, during the idle/leading state, the UBUSTR signal is derived from the delayed leading event selected from leading MUX 520, and the UBUSOE# is derived from the delayed leading event selected from leading MUX 540. One SYSCLK cycle after the generation of the active ANYCMD signal, cycle tracking logic 510 transitions into a trailing state. The CMD status indicates the initiation of the trailing state, and a delayed trailing event from trailing MUXs 525 and 545 are selected at state MUXs 530 and 550 respectively. The delayed trailing events comprise the output references UBUSTR and UBUSOE# during the trailing state. The cycle tracking logic 510 remains in the trailing state until the expiration of the bus cycle as indicated by the ANYCMD signal.

Figure 6:
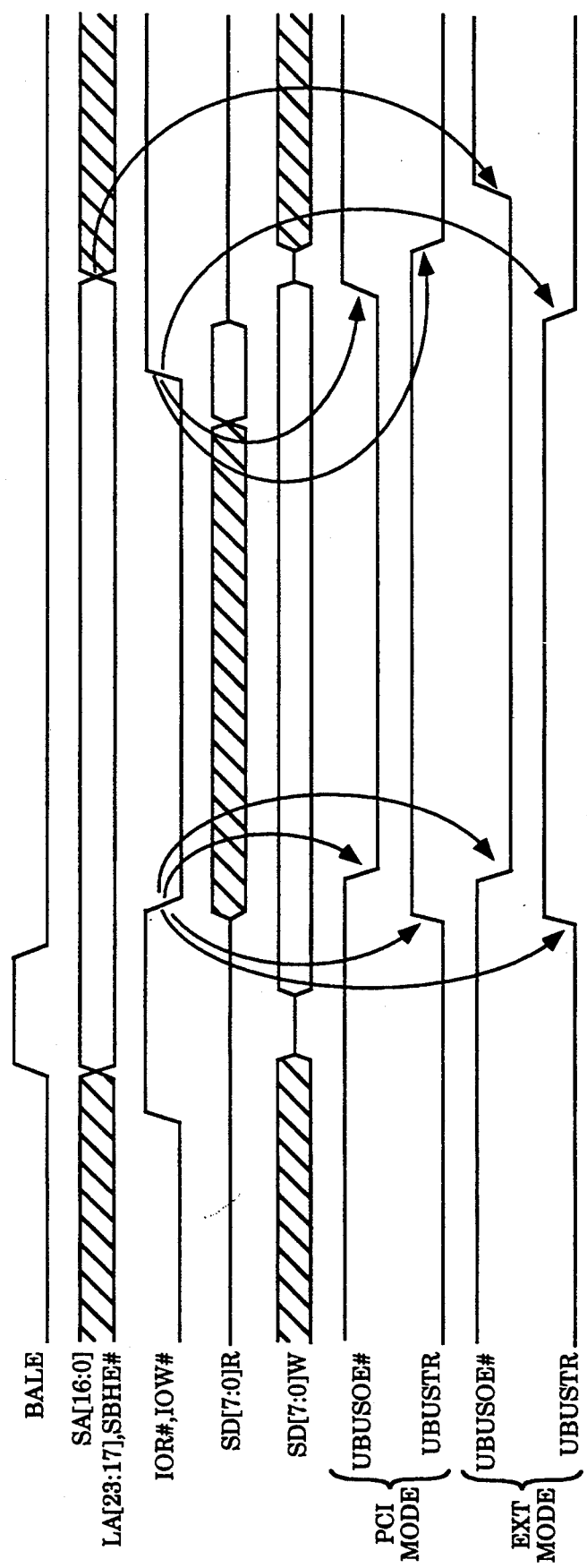
FIG. 6 illustrates a timing diagram for bus cycle timing events for the PCI and EXT modes.

Referring to FIG. 6, a timing diagram illustrating the bus cycle timing signals for the PCI and EXT modes are illustrated. The PCI mode indicates a PCI master initiated bus cycle, and EXT mode indicates a ISA Master bus cycle. The ANYCMD signal is activated by the falling edge of the IOR# or the IOW# signal. For the PCI mode, the rising edge of the UBUSTR is generated in reference to the command signal (IOR# or IOW#), and the falling edge of the UBUSOE# signal is also generated in reference to the command signals. For the PCI mode, the UBUSOE# and the UBUSTR signals are terminated in relationship to the command signal ending. Because the output reference signals UBUSOE# and UBUSTR are generated in reference to the command signals only, the command signals are used for the timing reference for both the leading and trailing states as shown in FIGS. 5a and 5b.

Still referring to FIG. 6, timing relationships for bus cycle events for an ISA external master initiated bus cycle are illustrated. An ISA external master initiated bus cycle is indicated by the EXT mode. For the EXT mode, the initiation of the bus cycle is indicated by a command signal (IOR# or IOW#). The beginning cycle periods for both the UBUSOE# and UBUSTR signals are in reference to the initiation of the command cycle as shown in FIG. 6. However, an invalid address on the SA address bus SA[16:0]LA[23:17], is the trailing bus cycle event for the termination of the UBUSOE# signal. For the UBUSTR signal, the termination of the period is in reference to the command signals. Therefore, when the system I/O indicates an EXT mode, the ANYCMD signal is input to T/R delay module 515 for both the leading and trailing reference signal, and ANYCMD and SA signals are provided to enable delay module 535 for the leading and trailing states respectively. SD[7:0]R signal represents the times for which read data are valid, and the SD[7:0]W wave form represents the periods for which write data are valid. For a full description of a bus cycle transfer in the ISA external master mode, see System I/O SIO 82378IB, revision 1.0, Order Number: 290473-001, Intel ™ Corporation.

Figure 7:
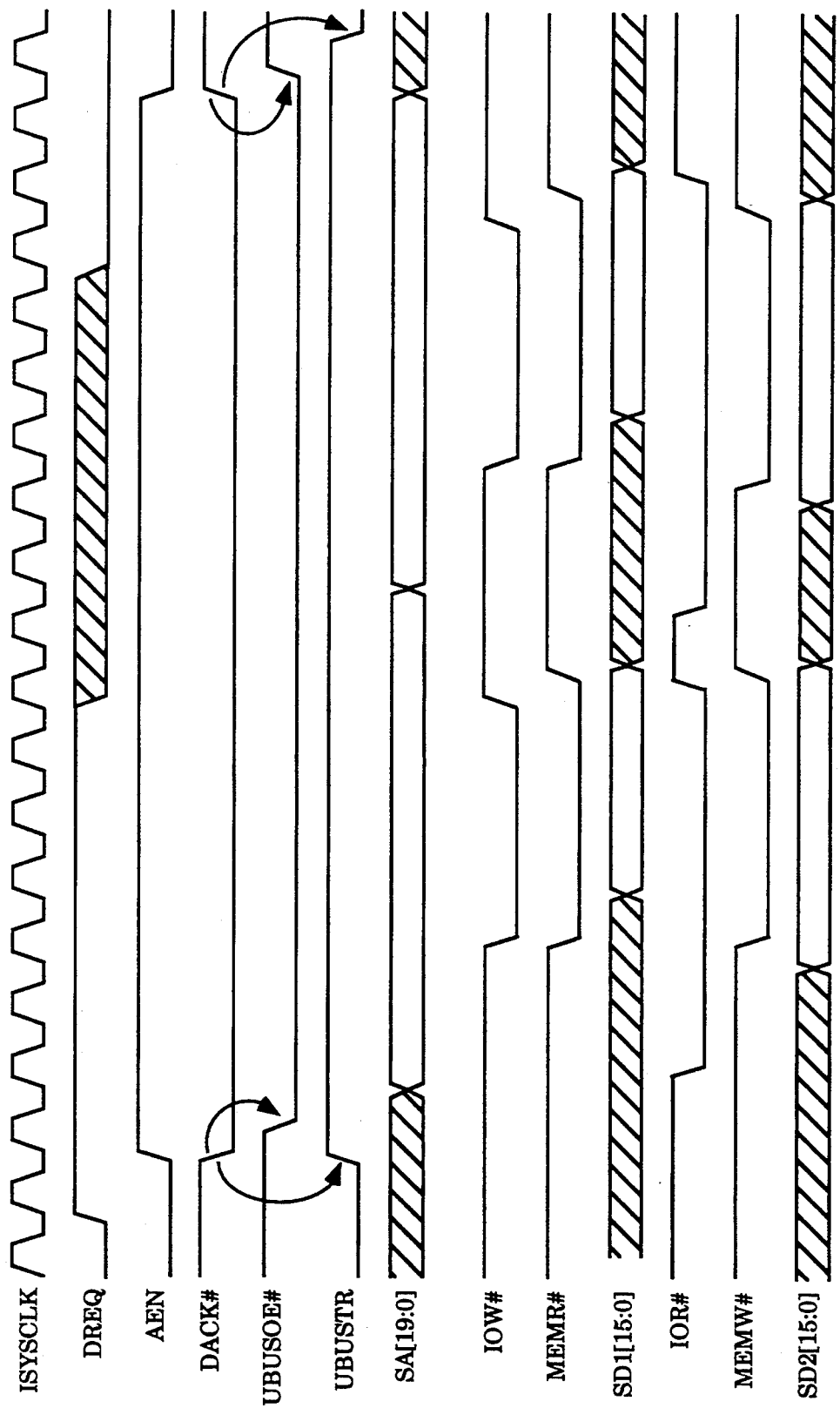
FIG. 7 illustrates bus cycle timing events for a DMA mode.

Referring to FIG. 7, bus timing signals for a DMA transfer mode are illustrated. In the DMA mode, both the UBUSOE# and UBUSTR signals are actively generated in reference to the falling edge of the DACK# signal. The UBUSOE# and UBUSTR signals are inactivated in reference to the rising edge of the DACK# signal. Therefore, to generate both the UBUSTR and UBUSOE# signals, the DACK#2 signal is provided to both the T/R delay 515 and enable delay 535 modules. The $SD_1[15:0]$ wave form represents the time period for which data are valid for the IOW# and MEMR# commands. Similarly, the $SD_2[15:0]$ wave form represents the time period for which data are valid for the IOR# and MEMW# command signals. The DMA request (DREQ) and address enable (AEN) signals are provided for sake of completeness for a transaction occurring on the ISA bus. For a full description of a bus cycle transfer in the DMA transfer mode see System I/O SIO 82378IB, revision 1.0, Order Number: 290473-001, Intel ™ Corporation.

As will be apparent by one skilled in the art, the generation of UBUSTR and UBUSOE# signals are independent and can be initiated and terminated by any bus cycle event. In this way, the present invention provides complete flexibility for generation of the output reference signals. If a designer changes the hardware implementations such that the AC timing characteristics of UBUSTR and UBUSOE# change, all that is required is a change in the delay values of delay modules 515 and 535. In addition, if the AC specifications for the ISA bus change, all that is required is changing of the delay values in delay modules 515 and 535. Therefore, changing of AC specifications results in only changing the appropriate delay line. This results in AC specifications being programmable at the schematic level.

Although the present invention has been described in terms of a preferred embodiment, it will be appreciated that various modifications and alterations might be made by those skilled in the art without departing from the spirit and scope of the invention. The invention should therefore be measured in terms of the claims which follow.

I claim:

1. An apparatus for generating an output reference during a bus cycle, said apparatus comprising:

a bus;

a bus controller coupled to said bus for generating a plurality of leading bus cycle events, a plurality of trailing bus cycle events, and a bus mode for said bus cycle;

a plurality of delay lines coupled to receive said leading bus cycle events and said trailing bus cycle events for delaying each leading bus cycle event and each trailing bus cycle event a pre-determined time to generate a plurality of delayed leading bus cycle events and a plurality of delayed trailing bus cycle events;

a first multiplexer coupled to said delay lines to receive, as inputs, said plurality of delayed leading bus cycle events, and to generate, as an output, a single delayed leading bus cycle event;

a second multiplexer coupled to said delay lines to receive, as inputs, said plurality of delayed trailing bus cycle events, and to generate, as an output, a single delayed trailing bus cycle event;

a third multiplexer coupled to said first and second multiplexers to receive, as inputs, said single delayed leading bus cycle event and said single delayed trailing bus cycle event, and to generate, as an output, an output reference; and cycle tracking logic coupled to said bus controller to receive said bus mode and coupled to said first and second multiplexers to select said single delayed leading bus cycle event and said single delayed trailing bus cycle event for said bus cycle, and for controlling said third multiplexer to select, during a leading state, said single delayed leading bus cycle event as said output reference, and to select, during a trailing state, said delayed trailing bus cycle event as said output reference such that said cycle tracking logic selects said single delayed trailing bus cycle in said second multiplexer before said trailing state in said third multiplexer so that said single delayed trailing bus cycle event is stable during selection as said output reference to provide glitch protection for said output reference, wherein changing said output reference in response to a change in a timing specification for said bus requires only changing said pre-determined time for said delay lines.

2. The apparatus as set forth in claim 1, wherein:
said mode comprises a peripheral component interconnect (PCI) master initiated bus cycle mode;
said leading bus cycle event comprises a leading edge of an input/output read (IOR#) command; and
said trailing bus cycle event comprises a trailing edge of said IOR# command.

3. The apparatus as set forth in claim 1, wherein:
said mode comprises an industry standard association (ISA) master initiated bus cycle mode;
said leading bus cycle event comprises a leading edge of an input/output read (IOR#) command; and
said trailing bus cycle event comprises a trailing edge of valid addresses for said ISA master initiated bus cycle.

4. The apparatus as set forth in claim 1, wherein:
said mode comprises a direct memory access (DMA) mode;
said leading bus cycle event comprises a leading edge of a direct memory access acknowledgment (DACK)# signal; and
said trailing bus cycle event comprises a trailing edge of a DACK# signal.

5. The apparatus as set forth in claim 1, wherein:
said mode comprises a peripheral component interconnect (PCI) master initiated bus cycle mode;
said leading bus cycle event comprises a leading edge of an input/output write (IOW#) command; and
said trailing bus cycle event comprises a trailing edge of said IOW# command.

6. The apparatus as set forth in claim 1, wherein:
said mode comprises an industry standard association (ISA) master initiated bus cycle mode;
said leading bus cycle event comprises a leading edge of an input/output write (IOW#) command; and
said trailing bus cycle event comprises a trailing edge of valid addresses for said ISA master initiated bus cycle.

7. An apparatus for generating an output reference, said apparatus comprising:
data transfer means;
controller means coupled to said data transfer means for effectuating a transfer cycle on said data transfer means including for generating at least one leading event, at least one trailing event, and for specifying a mode for each transfer cycle;
delay means coupled to receive said at least one leading event and said at least one trailing event for delaying each leading event and each trailing event a pre-determined time to generate a plurality of delayed leading events and a plurality of delayed trailing events;
cycle tracking means for specifying a leading state and a trailing state for said transfer cycle
mode selection means coupled to said cycle tracking means and said delay means for selecting one of said plurality of leading events and one of said plurality of trailing events based on said mode select; and
state selection means coupled to said mode selection means and said cycle tracking means for selecting said leading event during said leading state and for selecting said trailing event during said trailing state, wherein said cycle tracking means selects said delayed trailing event before said trailing state such that said delayed trailing event is stable during selection as said output reference to provide glitch protection for said output reference,
wherein changing said output reference in response to a change in a timing specification for said data transfer means requires only changing delay in said delay means.

8. The apparatus as set forth in claim 7, wherein:
said mode comprises a peripheral component interconnect (PCI) master initiated bus cycle mode;
said leading event comprises a leading edge of an input/output write (IOW#) command; and
said trailing event comprises a trailing edge of said IOW# command.

9. The apparatus as set forth in claim 7, wherein:
said mode comprises a peripheral component interconnect (PCI) master initiated bus cycle mode;
said leading event comprises a leading edge of an input/output read (IOR#) command; and
said trailing event comprises a trailing edge of said (IOR#) command.

10. The apparatus as set forth in claim 7, wherein:
said mode comprises an industry standard association (ISA) master initiated bus cycle mode;
said leading event comprises a leading edge of an input/output write (IOW#) command; and
said trailing event comprises a trailing edge of valid addresses for said ISA master initiated bus cycle.

11. (New) The apparatus as set forth in claim 7, wherein:
said mode comprises an industry standard association (ISA) master initiated bus cycle mode;
said leading event comprises a leading edge of an input/output read (IOR#) command; and
said trailing event comprises a trailing edge of valid addresses for said ISA master initiated bus cycle.

12. A method for generating an output reference during a bus cycle, said method comprising:
receiving a plurality of leading bus cycle events, a plurality of trailing bus cycle events, and a bus mode for said bus cycle;
delaying each leading bus cycle event and each trailing bus cycle event a pre-determined time to generate a plurality of delayed leading bus cycle events and a plurality of delayed trailing bus cycle events;
specifying a leading state and a trailing state for said bus cycle;
selecting a delayed leading bus cycle event and a delayed trailing bus cycle event in accordance with said bus mode for said bus cycle including selecting said delayed trailing bus cycle event before said trailing state;
selecting, during said leading state, said delayed leading bus cycle event selected as said output reference; and
selecting, during said trailing state, said delayed trailing bus cycle event selected as said output reference such that said delayed trailing bus cycle event is stable during selection as said output reference to provide glitch protection for said output reference.

13. A computer system comprising:
   at least one central processing unit;
   main memory;
   a peripheral component interconnect (PCI) bus for coupling said central processing unit to said main memory;
   a plurality of utility devices for providing a plurality of internal functions for said computer system;
   a utility bus coupled to said plurality of utility devices for accessing said plurality of utility devices;
   a plurality of external input/output (I/O) devices for providing a plurality of external functions for said computer system;
   an industry standard association (ISA) bus coupled to said plurality of external I/O devices for coupling said external I/O devices to said computer system;
   a transceiver coupled to said ISA bus and said utility bus for interfacing to said ISA bus; and
   a system input/output (I/O) interface coupled to said PCI bus, said utility bus, said ISA bus and said transceiver for interfacing said ISA bus, utility bus and PCI bus, said system I/O interface comprising:
      an ISA bus controller coupled to said ISA bus for generating a plurality of leading bus cycle events, a plurality of trailing bus cycle events, and a bus mode for said bus cycle;
      a plurality of delay lines coupled to receive said leading bus cycle events and said trailing bus cycle events for delaying each leading bus cycle event and each trailing bus cycle event a pre-determined time to generate a plurality of delayed leading bus cycle events and a plurality of delayed trailing bus cycle events;
      a first multiplexer coupled to said delay lines to receive, as inputs, said plurality of delayed leading bus cycle events, and to generate, as an output, a single delayed leading bus cycle event;
      a second multiplexer coupled to said delay lines to receive, as inputs, said plurality of delayed trailing bus cycle events, and to generate, as an output, a single delayed trailing bus cycle event;
      a third multiplexer coupled to said first and second multiplexers to receive, as inputs, said single delayed leading bus cycle event and said single delayed trailing bus cycle event, and to generate, as an output, an output reference; and
      cycle tracking logic coupled to said ISA bus controller to receive said bus mode and coupled to said first and second multiplexers to select said single delayed leading bus cycle event and said single delayed trailing bus cycle event for said bus cycle, and for controlling said third multiplexer to select, during a leading state, said single delayed leading bus cycle event as said output reference, and to select, during a trailing state, said delayed trailing bus cycle event as said output reference such that said cycle tracking logic selects said single delayed trailing bus cycle in said second multiplexer before said trailing state in said third multiplexer so that said single delayed trailing bus cycle event is stable during selection as said output reference to provide glitch protection for said output reference, wherein changing said output reference in response to a change in a timing specification for said bus requires only changing said pre-determined time for said delay lines.

14. The computer system as set forth in claim 13, wherein:
   said mode comprises a peripheral component interconnect (PCI) master initiated bus cycle mode;
   said leading bus cycle event comprises a leading edge of an input/output read (IOR#); and
   said trailing bus cycle event comprises a trailing edge of said IOR# command.

15. The computer system as set forth in claim 13, wherein:
   said mode comprises an industry standard association (ISA) master initiated bus cycle mode;
   said leading bus cycle event comprises a leading edge of an input/output read (IOR#) command; and
   said trailing bus cycle event comprises a trailing edge of valid addresses for said ISA master initiated bus cycle.

16. The computer system as set forth in claim 13, wherein:
   said mode comprises a direct memory access (DMA) mode;
   said leading bus cycle event comprises a leading edge of a DACK# signal; and
   said trailing bus cycle event comprises a trailing edge of a DACK# signal.

17. The computer system as set forth in claim 13, wherein:
   said mode comprises a peripheral component interconnect (PCI) master initiated bus cycle mode;
   said leading bus cycle event comprises a leading edge of an input/output write (IOW#) command; and
   said trailing bus cycle event comprises a trailing edge of said IOW# command.

18. The computer system as set forth in claim 13, wherein:
   said mode comprises an industry standard association (ISA) master initiated bus cycle mode;
   said leading bus cycle event comprises a leading edge of an input/output write (IOW#) command; and
   said trailing bus cycle event comprises a trailing edge of valid addresses for said ISA master initiated bus cycle.

19. A computer system comprising:
   central processing means;
   storage means;
   first bus means for coupling said central processing means to said storage means;
   utility device means for providing a plurality of internal functions for said computer system;
   second bus means coupled to said utility devices for accessing said utility devices;
   external input/output (I/O) device means for providing a plurality of external functions for said computer system;
   third bus means coupled to said external I/O means for coupling said external I/O device means to said computer system;
   transceiver means coupled to said second bus means and said third bus means for controlling transferring of data between said second bus means and said third bus means; and
   system input/output (I/O) means coupled to said first bus means, said third bus means, said external I/O means and said transceiver means for interfacing among said first, second and third bus means, said system I/O means comprising;

controller means coupled to said third bus means for effectuating a transfer cycle on said third bus means including generating at least one leading event, at least one trailing event, and for specifying a mode for each transfer cycle;

delay means coupled to receive said at least one leading event and said at least one trailing event for delaying each leading event and each trailing event a pre-determined time to generate a plurality of delayed leading events and a plurality of delayed trailing events;

cycle tracking means for specifying a leading state and a trailing state for said transfer cycle;

mode selection means coupled to said cycle tracking means and said delay means for selecting one of said leading events and one of said trailing events based on said mode select; and state selection means coupled to said mode selection means and said cycle tracking means for selecting said delayed leading event during said leading state and selecting said delayed trailing event during said trailing state such that said cycle tracking means selects said delayed trailing event before said trailing state so-that said delayed trailing event is stable during selection as said output reference to provide glitch protection for said output reference, wherein changing said output reference in response to a change in a timing specification for said third bus means requires only changing delay in said delay lines.

\* \* \* \* \*

UNITED STATES PATENT AND TRADEMARK OFFICE
CERTIFICATE OF CORRECTION

PATENT NO. : 5,444,857
DATED : August 22, 1995
INVENTOR(S) : Rowland It is certified that error appears in the above-identified patent and that said Letters Patent is hereby corrected as shown below:

In column 2, at line 52, delete "anal" and substitute --and--

In column 7, at line 44, insert --SBHE#,-- after "SA[16:0]LA[23:17],"

In column 10, at line 40, delete "(New)"

In column 12, at line 8, insert --command-- after "(IOR#)"

In column 14, at line 9, delete "so-that" and substitute --so that--.

Signed and Sealed this

Twenty-fourth Day of September, 1996

*Attest:*

BRUCE LEHMAN

*Attesting Officer*   *Commissioner of Patents and Trademarks*